(12) United States Patent
Neill

(10) Patent No.: US 7,716,237 B2
(45) Date of Patent: May 11, 2010

(54) SYSTEM AND ASSOCIATED METHODS FOR REMOTELY ENABLING FEATURES

(75) Inventor: Richard W. Neill, Syosset, NY (US)

(73) Assignee: CSC Holdings, Inc., Bethpage, NY (US)

( * ) Notice: Subject to any disclaimer, the term of this patent is extended or adjusted under 35 U.S.C. 154(b) by 368 days.

(21) Appl. No.: 11/017,794

(22) Filed: Dec. 22, 2004

(65) Prior Publication Data

US 2006/0136384 A1  Jun. 22, 2006

(51) Int. Cl.
 *G06F 7/00* (2006.01)
 *G06F 15/177* (2006.01)

(52) U.S. Cl. ..................... 707/769; 709/220

(58) Field of Classification Search ............ 707/9, 707/3; 709/220
See application file for complete search history.

(56) References Cited

U.S. PATENT DOCUMENTS

| | | | | |
|---|---|---|---|---|
| 5,600,364 A * | 2/1997 | Hendricks et al. | ............. | 725/9 |
| 5,619,250 A * | 4/1997 | McClellan et al. | ............. | 725/132 |
| 5,630,119 A * | 5/1997 | Aristides et al. | ............. | 707/1 |
| 5,689,708 A * | 11/1997 | Regnier et al. | ............. | 709/229 |
| 5,708,709 A * | 1/1998 | Rose | ............. | 705/59 |
| 5,751,282 A * | 5/1998 | Girard et al. | ............. | 715/721 |
| 5,870,667 A * | 2/1999 | Globuschutz | ............. | 455/419 |
| 5,883,956 A * | 3/1999 | Le et al. | ............. | 713/170 |
| 5,954,808 A * | 9/1999 | Paul | ............. | 710/104 |
| 6,134,549 A * | 10/2000 | Regnier et al. | ............. | 707/9 |
| 6,154,633 A * | 11/2000 | Landgraf et al. | ............. | 725/151 |
| 6,219,042 B1 * | 4/2001 | Anderson et al. | ............. | 715/716 |
| 6,324,578 B1 * | 11/2001 | Cox et al. | ............. | 709/223 |
| 6,678,733 B1 * | 1/2004 | Brown et al. | ............. | 709/229 |
| 6,704,776 B1 * | 3/2004 | Fortune | ............. | 709/219 |
| 6,732,179 B1 * | 5/2004 | Brown et al. | ............. | 709/229 |
| 6,742,029 B2 * | 5/2004 | Vasamsetti et al. | ............. | 709/223 |
| 6,959,320 B2 * | 10/2005 | Shah et al. | ............. | 709/203 |
| 7,552,192 B2 * | 6/2009 | Carmichael | ............. | 709/217 |
| 2002/0087883 A1 * | 7/2002 | Wohlgemuth et al. | ............. | 713/201 |
| 2002/0157089 A1 * | 10/2002 | Patel et al. | ............. | 717/178 |
| 2003/0058277 A1 * | 3/2003 | Bowman-Amuah | ............. | 345/765 |
| 2003/0146940 A1 * | 8/2003 | Ellis et al. | ............. | 345/811 |
| 2004/0003400 A1 * | 1/2004 | Carney et al. | ............. | 725/42 |
| 2004/0054771 A1 * | 3/2004 | Roe et al. | ............. | 709/224 |
| 2004/0088176 A1 * | 5/2004 | Rajamani | ............. | 705/1 |

(Continued)

OTHER PUBLICATIONS

Furht, Borko, et al., "An Innovative Internet Architecture for Application Service Providers", Proc. of the 33rd Hawaii International Conf. on System Sciences, Maui, HI, Jan. 4-7, 2000, pp. 1-10.*

(Continued)

*Primary Examiner*—Robert Stevens
(74) *Attorney, Agent, or Firm*—Goodwin Procter LLP

(57) ABSTRACT

A method and apparatus enables a feature among a plurality of features in an application loaded on a client, with the client located remotely from a server. The server receives a data profile request from the client. In response to the data profile request, a data profile is sent from the server to the client, the data profile including a profile key to identify the client, an application identification to identify the application, and a feature selector. The application uses the feature selector to enable the feature among the plurality of features.

24 Claims, 5 Drawing Sheets

U.S. PATENT DOCUMENTS

| | | | |
|---|---|---|---|
| 2004/0122888 A1* | 6/2004 | Carmichael | 709/200 |
| 2004/0193913 A1* | 9/2004 | Han et al. | 713/200 |
| 2004/0261116 A1* | 12/2004 | Mckeown et al. | 725/109 |
| 2005/0021766 A1* | 1/2005 | McKeowen et al. | 709/228 |
| 2005/0027851 A1* | 2/2005 | McKeown et al. | 709/224 |
| 2005/0028206 A1* | 2/2005 | Cameron et al. | 725/46 |
| 2005/0097343 A1* | 5/2005 | Altenhofen | 713/191 |
| 2005/0235319 A1* | 10/2005 | Carpenter et al. | 725/52 |
| 2005/0252963 A1* | 11/2005 | Adams et al. | 235/382 |
| 2007/0061488 A1* | 3/2007 | Alagappan et al. | 709/246 |
| 2009/0217310 A1* | 8/2009 | Koretz | 719/328 |

OTHER PUBLICATIONS

Rath, Kamlesh, et al., "Set-top Box Control Software: A Key Component in Digital Video", Philips Journal of Research, vol. 50, Issues 1-2, © 1996, pp. 185-199.*

Bissell, R. A., et al., "The Set-top Box for Interactive Services", BT Technol. J., vol. 13, No. 4, Oct. 1995, pp. 66-77.*

Peng, C., et al., "Digital Television Application Manager", 2001 International Conf. on Multimedia and Expo, Tokyo, Japan, Aug. 22-25, 2001, pp. 685-688.*

Cranor, Charles D., et al., "Enhanced Streaming Services in a Content Distribution Network", IEEE Internet Computing, Jul./Aug. 2001, pp. 66-75.*

Chakravorty, Rajiv, et al., "Architecture and Implementation of a Remote Management Framework for Dynamically Reconfigurable Devices", ICON 2002, © IEEE 2002, pp. 375-380.*

* cited by examiner

SYSTEM AND ASSOCIATED METHODS FOR REMOTELY ENABLING FEATURES

TECHNICAL FIELD

The present invention relates to systems and methods for remotely enabling one or more features. The features may be features in an application loaded on a client, which are remotely enabled from a server.

BACKGROUND OF THE INVENTION

Devices such as cell phones, PDAs, cable boxes and other devices often have a plurality of features that a particular user may or may not desire to use with the device. These features may be included within an application, such as a software application, stored in memory on the device, such that they may be selectively activated. A user will usually select such features upon purchasing the device, such as with a cell phone, or upon signing up for a service, such as with cable television. The features are typically set in the device before it is given to the user. It would be advantageous if the features could be selectively enabled and/or disabled from a remote location.

Providers of video, audio, or other content, such as phone or cable companies, are converting from analog delivery systems to more sophisticated digital delivery systems. These systems are being deployed, and will, over time, phase out the analog delivery systems. For example, cable companies are offering digital set top boxes to customers, that offer more viewing choices to the customer. These digital set top boxes may offer additional features and services such as additional channels, interactive user interfaces, digital programming, pay-per view, video-on-demand, subscription video-on-demand, etc.

Many providers of such video content provide to users in more than one geographic area. The providers are now offering content such as weather or traffic conditions that may be different for users in different geographic areas. It would be beneficial if this information could be individualized to the particular customer.

Additionally, such content providers may employ diagnostics in a set top box provided to the customer. This often involves pre-installing diagnostic software or code on each set top box, or downloading the diagnostics to each set top box. As the diagnostics become more and more complex, often with multiple levels of diagnostics, the software uses more memory and computational resources. The diagnostics are often run from a remote location, such as a head end. Such use makes it difficult to program each user's box individually with the appropriate level of diagnostics. It would be advantageous if different levels of diagnostics could be selectively enabled and disabled from a remote location.

SUMMARY OF THE INVENTION

A method and apparatus enables a feature among a plurality of features in an application loaded on a client, with the client located remotely from a server. The server receives a data profile request from the client. In response to the data profile request, a data profile is sent from the server to the client, the data profile including a profile key to identify the client, an application identification to identify the application, and a feature selector. The application uses the feature selector to enable the feature among the plurality of features.

DETAILED DESCRIPTION

The present invention enables a feature among a plurality of features in an application loaded on a client, with the client located remotely from a server. The server receives a data profile request from the client. In response to the data profile request, a data profile is sent from the server to the client, the data profile including a profile key to identify the client, an application identification to identify the application, and a feature selector. The application uses the feature selector to enable the feature among the plurality of features.

Figure 1:
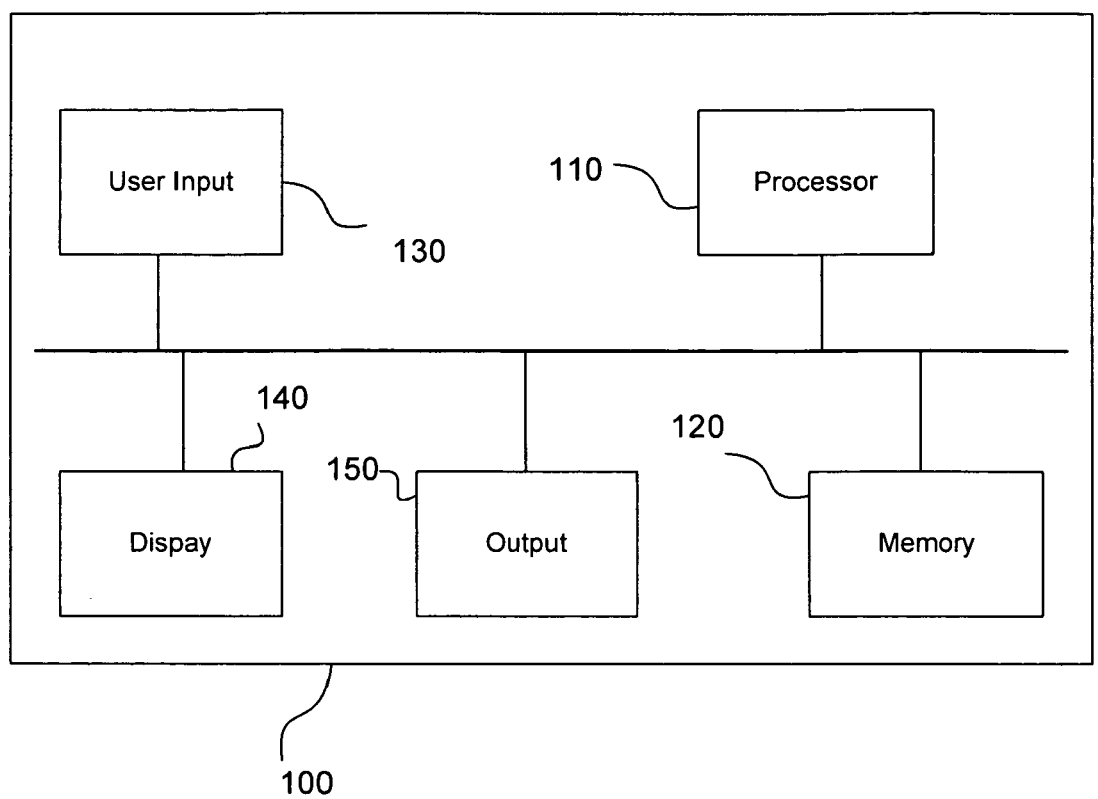
FIG. 1 is a block diagram in accordance with an embodiment of the present invention.

FIG. 1 depicts a block diagram of an embodiment of the present invention. Computing device 100 is suitable for use with the present invention. The computing device 100 may include a processor 110, a memory 120, an user input 130, a display 140, and an output 150. The memory 120 may contain software to be run in conjunction with processor 110, and may cause images to be displayed on display 140. The software is specifically designed to cause computing device 100 to implement the present invention. Computing device 100 may be one of various types of computing devices, such as a workstation, a personal computer, a server, a head-end in a cable system, set top box, home media gateway, or any other type of computing device.

The processor 110 may be a general-purpose microprocessor, such a Pentium series microprocessor manufactured by the Intel Corporation of Santa Clara, Calif. In another embodiment, the processor 110 can be an Application Specific Integrated Circuit (ASIC), which has been designed to implement in its hardware and/or firmware at least a part of a method in accordance with embodiments of the present invention.

Memory 120 can be any device capable of storing analog or digital information, such as a hard disk, Random Access Memory (RAM), Read Only Memory (ROM), flash memory, a compact disk, a magnetic tape, a floppy disk, and any combination thereof, for example.

User input 130 can be any type of input device, such as a keyboard, keypad, pointing device, microphone, mouse, wired or wireless remote control, touch pad, touch screen, a port(s) to attach other input devices, voice recognition software, etc. Any type of input device will function in accordance with embodiments of the present invention.

The display 140 can be any type of display or screen that is capable of displaying images. For example, the display may be a CRT or LCD monitor, a heads-up display, a television, etc. The display 140 may be structurally included as part of the electronic device, or may be physically separated from but connected with the other components of device 100, such as a monitor in a desktop computer. The output 150 can be any type of output, such as a serial port, a wireless output, a connection to a cable modem, an infrared output, etc.

Figure 2:
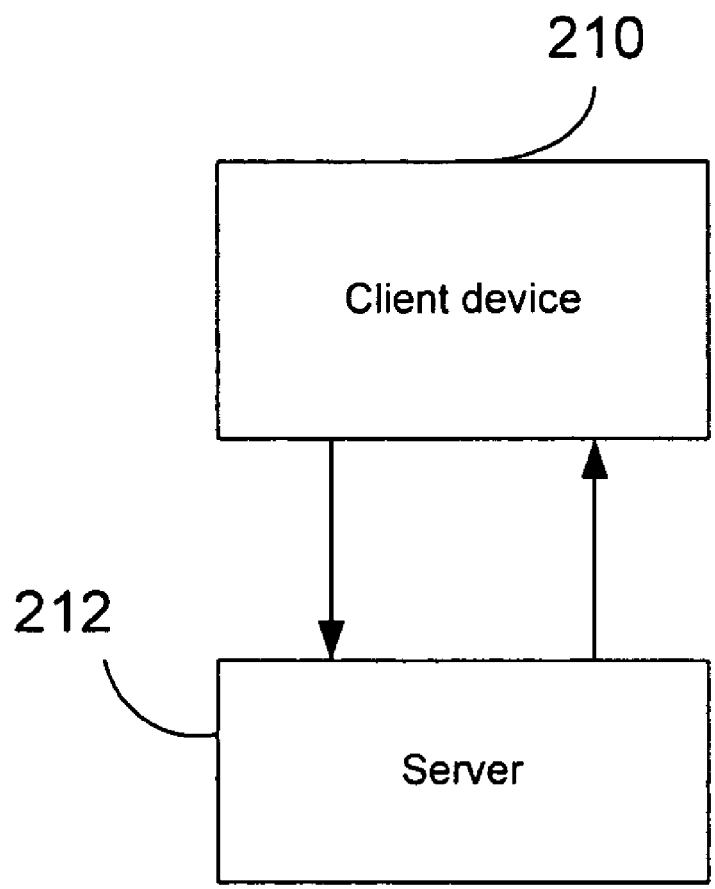
FIG. 2 is a block diagram in accordance with an embodiment of the present invention.

FIG. 2 depicts a block diagram of an embodiment of the present invention. The client device 210 may correspond to the computing device 100 of FIG. 1, and may include a processor 110, the memory 120, the user input 130, the display 140, and the output 150, as well as other computer elements. The server 220 may include the same elements. The client device 210 may be programmed with software in memory to carry out the present invention. The client device 210 is remote from the server 212. The client device may be a device such as a cell phone, a set top box in a cable television system, a PDA, a computer, or other type of electronic device. The server 212 may be a server located at a service provider location, for example, or another server programmed to carry out the present invention. For example, the server 212 could be a server located at a mobile phone service provider location, an Internet service provider location, or a cable television service provider location. The server 212 may communicate with the client device 210 in any way, such as wirelessly, over satellite, over telephone lines, over a cable television connection, etc. The means of communication between the client device 210 and the server 212 is not a critical part of the invention. The server 212 may be connected to a plurality of the client devices in a network.

The present invention allows a user to select features to be enabled. The user may select such features using the user input 130 in conjunction with display 140 by accessing programming that has been loaded into memory 120, with the programming being run by processor 110. For example, the user may be able to call up a display of available features, and select one or more features that the user wishes to be enabled. In response to such a selection of one or more features, the programming, loaded into the client device 210 will generate a data profile request, which is sent to the server 212. The data profile request will indicate which client device is sending the data profile request, and which features are desired to be enabled. As an alternative, the data profile request could be sent from the client device 210 to the server every time the client device is powered up, for example.

The client device may include one or more applications, which may be in the form of computer programs, stored in the memory 120. The applications may be stored on the client device 210 in advance, or may be downloaded or otherwise loaded into the client device at a later time. The applications may include features that are selectively enabled on the client device 210.

Upon receipt of the data profile request at the server 212, the server 212 generates a data profile, which includes a profile key, an application key, and a feature selector. The profile key identifies which client the data request is generated for. Thus, if the data profile is broadcast to a plurality of clients in a network such as a mobile phone or cable television network, each client will check the profile key to determine if it is destined for that particular client device. If it is not destined for that particular client device, it is disregarded and not used.

If the profile key indicates that it is designated for that particular client device, the client device 210 will examine the application identification to determine which among a plurality of applications it may apply to. Then, the client device will examine the feature selector included in the data profile, to determine which features should be enabled. The programs on the client device will then enable the desired features The present invention may also be used to enabled features that are not selected at the client device 210, but are selected at the server 212. For example, when the client device is powered on, it may send a data profile to the server 212, which will identify the client device. The server may be used to selectively enable features at one client device or at a group of client devices. For example, it may be determined that all client devices in a particular area should have a feature enabled. Such a feature could be a display of weather data or other data particular to that geographical area. In this case, the profile key could include identifying information particular to the geographical area, such as zip code, or could include an identification code for each client device 212. The feature may then be enabled at each client device 210.

This invention is particularly useful for remote diagnostics. For example, an application loaded on the client device may be a remote diagnostics application. The application may contain a plurality of diagnostic levels. The diagnostic levels may be prestored in memory of the client device 210, or may be loaded therein from the server 212 or from another location. In this way, the server can remotely set different diagnostic levels to be run on the client device 210. For example, the server 212 may access the client 210 and send a first diagnostic level. The server 212 may send a second diagnostic level. Any number of such diagnostic levels may be used. The server 212 may then receive from the client device results of the diagnostics and continue other diagnostic levels as required.

Figure 3:
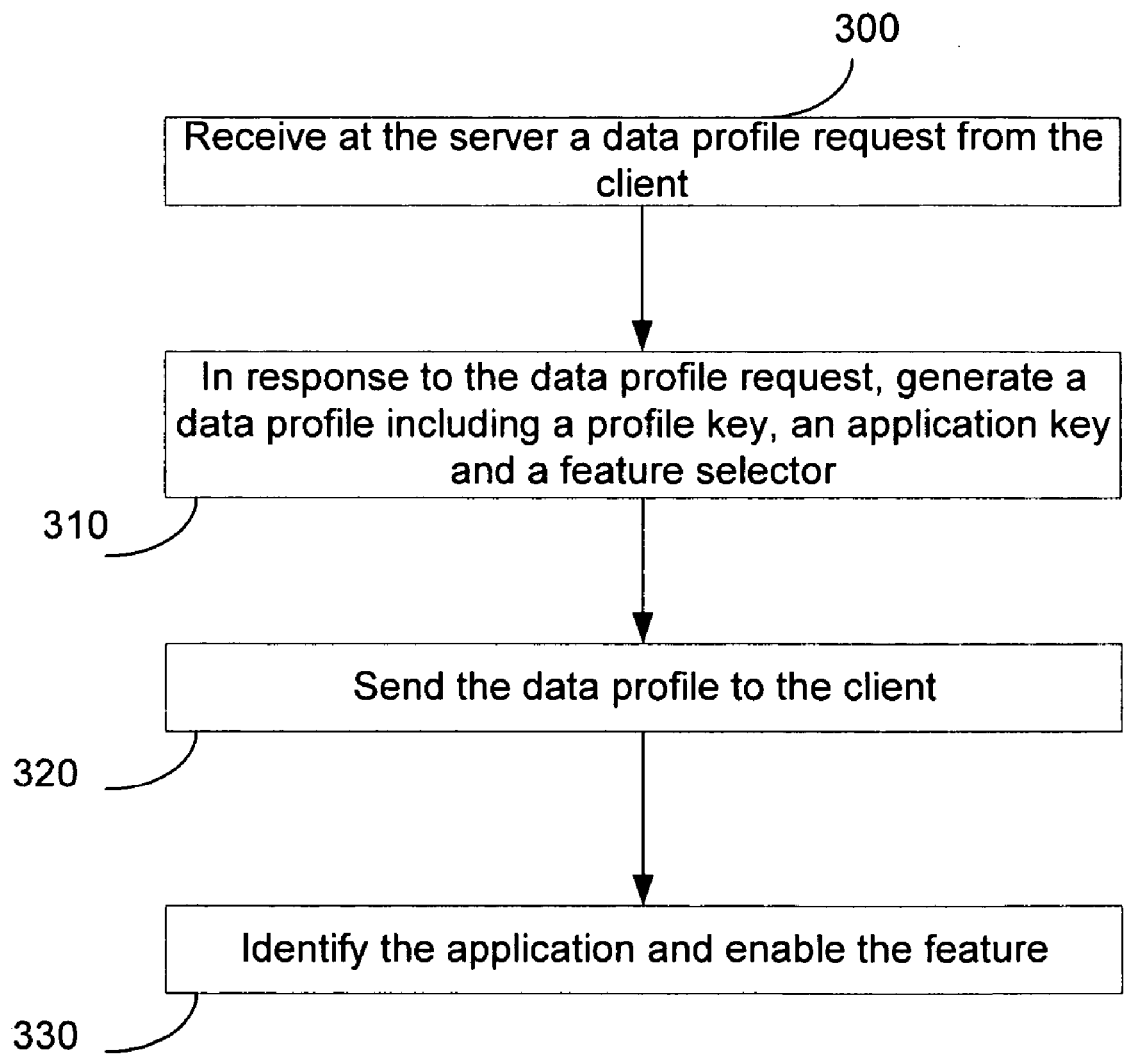
FIG. 3 is a flowchart in accordance with an embodiment of the present invention.

FIG. 3 is a flow chart illustrating steps carried out by an embodiment of the present invention. In step 300, the client device sends a data profile request to the server. As explained above, the data profile request will identify the client, and may include an indication of a feature or features that need to be enabled.

In step 310, in response to the data profile request, the server generates a data profile. The data profile includes a profile key, an application key and a feature selector. The profile key identifies the particular client, so that if the server is connected to more than one client, the client can determine whether the data profile is for that particular client. The profile key may identify more than one client. The application key identifies a particular application, so that if more than one application is on the client, the appropriate application made be determined. The feature selector identifies which feature should be enabled by the client. The server may generate more than one data profile, and may broadcast the data profile to multiple clients in a network, for example.

Figure 4:
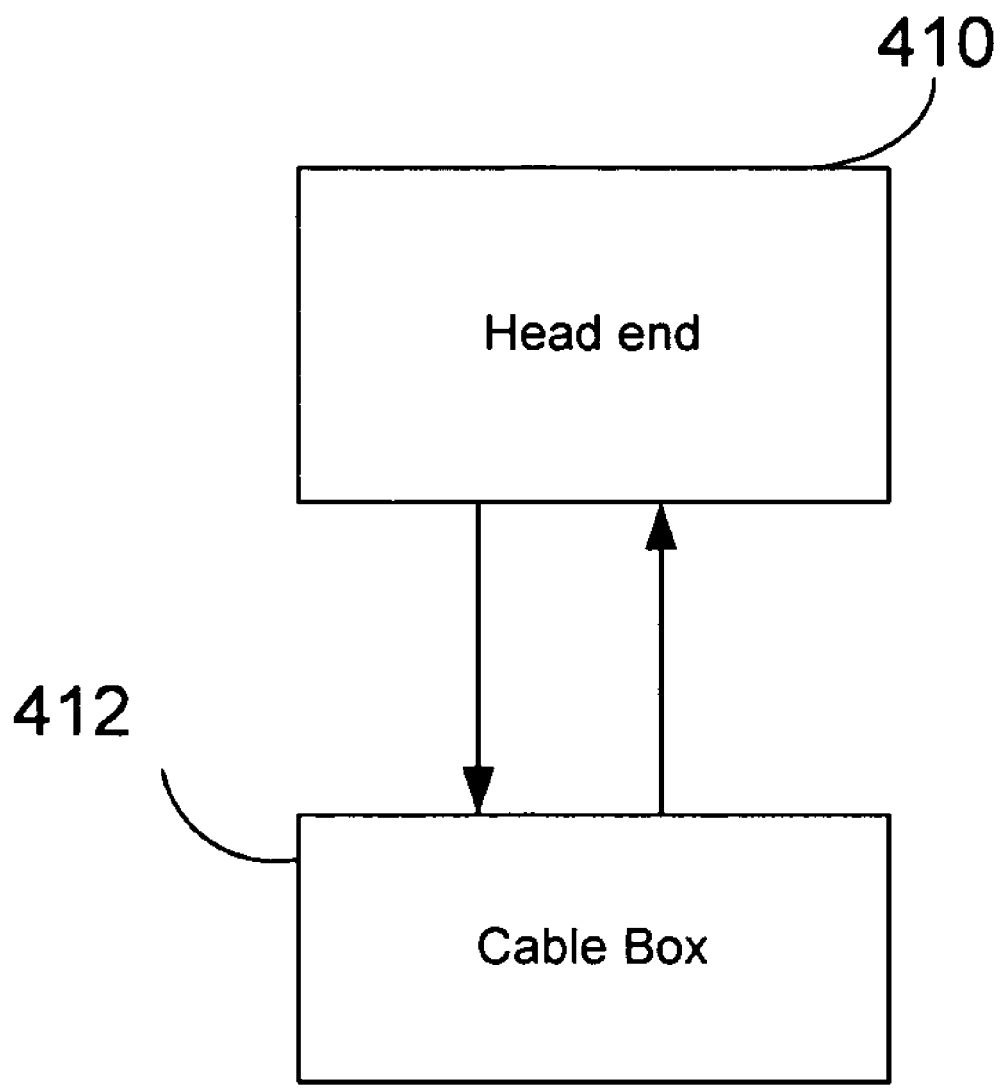
FIG. 4 is a block diagram in accordance with an embodiment of the present invention.

FIG. 4 illustrates a block diagram of an embodiment of the present invention. In this embodiment that is used with a cable television system, a head end 410 corresponds to the server 212 of FIG. 2. The head end may 410 comprise a server such as the one illustrated in FIG. 2, or may be another type of computing device. The head end and the cable box 412 may each comprise a computing device such as computing device 100, and may include additional computing elements. The head end 410 is located remotely from cable box 412, which is typically located at a user premises. The cable box 412 could alternatively be a type of device such as a personal computer, etc. The head end 410 and the cable box 412 carry out the process described below in conjunction with FIG. 5 so as to enable features on cable box 412.

Figure 5:
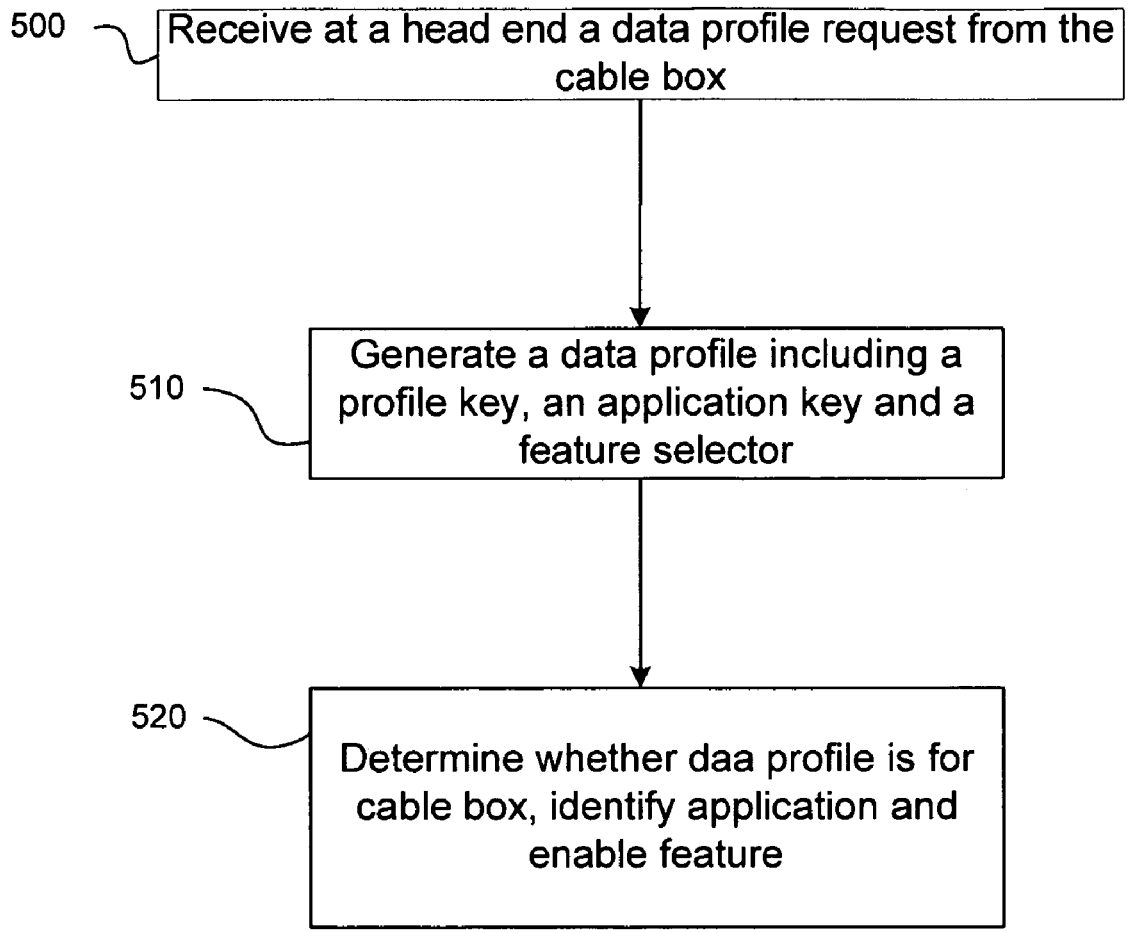
FIG. 5 is a flowchart in accordance with an embodiment of the present invention.

FIG. 5 illustrates a flowchart in accordance with embodiments of the present invention. In step 500, the present invention sends a data profile request from the cable box 412 to the head end 410 at a remote location. The data profile may be sent when the cable box 412 is powered on, at regular intervals, when a user indicates that a new feature or service is desired, or at other times. As described above, the head end 410 may be accessed by any means.

In step 510, the head end 410 receives the data profile request, and generates the data profile, which is sent to the cable box 412. The data profile includes the profile key, the application key and the feature selector as described above.

In step 520, the cable box 412 determines whether the data profile should be used, by examining the profile key as described above. If the data key indicates that the data profile is for that particular cable box, the cable box 412 examines the application key to determine which application should be used, and uses the feature selector to enable the appropriate feature.

In the embodiments described herein, the data profile request, and the data profile, including the profile key, the application key and the feature selector may be implemented in various known ways to send the appropriate information. For example, these items may be sent in a digital message, with certain portions of the message designated to include each of the required bits of information. The information may then be appropriately determined by the above-described computing elements and appropriate software using methods well known to those of ordinary skill in these arts.

Several embodiments of the present invention are specifically illustrated and described herein. However, it will be appreciated that modifications and variations of the present invention are covered by the above teachings and within the purview of the appended claims without departing from the spirit and intended scope of the invention.

What is claimed is:

1. A method of enabling a feature among a plurality of features in a diagnostic application loaded on a set-top box in a cable system, the set-top box located remotely from a head-end in the cable system, the method comprising:
   receiving at the head-end a data profile request, comprising at least one feature to be enabled in the diagnostic application, from the set-top box, the set-top box having loaded thereon software for implementing one or more of the plurality of features of the diagnostic application;
   in response to the data profile request, sending a data profile from the head-end to the set-top box, the data profile including a profile key to identify the set-top box, an application identification to identify the diagnostic application, and a feature selector, wherein the preloaded diagnostic application uses the feature selector to newly enable the one or more features of the diagnostic application.

2. The method of claim 1, wherein the profile key includes one of a home identification, a zip code or a serial number.

3. The method of claim 1, further comprising using the application identification to select-one diagnostic application from among a plurality of applications.

4. The method of claim 2, wherein the step of sending the data profile from the head-end to the set-top box includes selecting the set-top box based on the profile key.

5. The method of claim 1, wherein the software comprises computer-executable instructions for executing the diagnostics application.

6. The method of claim 5, wherein the feature selector selects a first diagnostic level from among a plurality of diagnostic levels at which the diagnostics application is to execute.

7. The method of claim 6, further comprising sending another data profile from the head-end to the set-top box, and using the another data profile to select a second diagnostic level from among the plurality of diagnostic levels.

8. The method of claim 1, wherein the application identifier identifies a plurality of client-resident applications including the diagnostic application.

9. The method of claim 8, wherein the feature selector selects a plurality of features.

10. The method of claim 1, wherein the head-end is connected to a plurality of set-top boxes, further comprising sending a different data profile to different ones of the set-top boxes to enable different features on the different set-top boxes.

11. An apparatus for enabling a feature among a plurality of features in a diagnostic application loaded on a set-top box in a cable system, the set-top box located remotely from a head-end in the cable system, comprising:
   a processor;
   a memory to store instructions to be executed by the processor, the instructions including instructions to:
      receive at the head-end a data profile request, comprising at least one feature to be enabled in the diagnostic application, from the set-top box, the set-top box having loaded thereon and in advance of the transmission of the data profile, software for enabling one or more of the plurality of features of the diagnostic application;
      in response to the data profile request, send a data profile from the head-end to the set-top box, the data profile including a profile key to identify the set-top box, an application identification to identify the diagnostic application, and a feature selector, wherein the diagnostic application uses the feature selector to newly enable the feature among the plurality of features of the diagnostic application.

12. The apparatus of claim 11, wherein the profile key includes one of a home identification, a zip code or a serial number.

13. The apparatus of claim 11, wherein the application identification is used to select the diagnostic application from among a plurality of client-resident applications.

14. The apparatus of claim 11, wherein the set-top box is selected based on the profile key.

15. The apparatus of claim 11, wherein the software comprises computer-executable instructions for executing the diagnostics application.

16. The apparatus of claim 14, wherein the feature selector selects a first diagnostic level from among a plurality of diagnostic levels at which the diagnostics application is to execute.

17. The apparatus of claim 16, wherein the instructions further include instructions to send another data profile from the head-end to the set-top box, and use the another data profile to select a second diagnostic level from among the plurality of diagnostic levels.

18. The apparatus of claim of claim 11, wherein the application identifier identifies a plurality of client-resident applications.

19. The apparatus of claim 18, wherein the feature selector selects a plurality of features.

20. The apparatus of claim 11, wherein the head-end is connected to a plurality of set-top boxes, and a different data profile is sent to different ones of the set-top boxes to enable different features on the different set-top boxes.

21. A machine-readable medium having stored thereon a plurality of executable instructions for enabling a feature among a plurality of features in a diagnostic application loaded on a set-top box in a cable system, the set-top box located remotely from a head-end in the cable system, the plurality of instructions comprising instructions to:
   receive at the head-end a data profile request, comprising at least one feature to be enabled in the diagnostic application, from the set-top box, the set-top box having loaded thereon software for implementing one or more of the plurality of features of the pre-loaded diagnostic application;

in response to the data profile request, send a data profile from the head-end to the set-top box, the data profile including a profile key to identify the set-top box, an application identification to identify the diagnostic application, and a feature selector, wherein the diagnostic application uses the feature selector to newly enable the feature among the plurality of features of the diagnostic application.

22. An apparatus for executing a diagnostics application loaded on a set-top box in a cable system, the set-top box located remotely from a head-end in the cable system, the apparatus comprising:

a processor;

a memory to store instructions to be executed by the processor, the instructions including instructions to:

receive at the head-end a data profile request, comprising at least one feature to be enabled in the diagnostic application, from the set-top box, the set-top box having loaded thereon software for executing the diagnostics application, the diagnostics application permitting the head-end to request execution of varying levels of diagnostics by the diagnostic application;

in response to the data profile request, send a data profile from the head-end to the set-top box, the data profile including a profile key to identify the set-top box, an application identifier to identify the diagnostics application, and a feature selector, wherein the diagnostics application uses the feature selector to determine a diagnostics level at which to execute.

23. The apparatus of claim 22 wherein the feature selector selects a first diagnostic level from among a plurality of diagnostic levels.

24. The apparatus of claim 23, wherein the instructions further include instructions to send another data profile from the head-end to the set-top box, and use the another data profile to select a second diagnostic level from among the plurality of diagnostic levels.

* * * * *